United States Patent [19]

Kadi

[11] Patent Number: 4,582,516
[45] Date of Patent: Apr. 15, 1986

[54] FAST REGENERATING ADSORPTION COLUMN

[75] Inventor: Frank J. Kadi, New Tripoli, Pa.

[73] Assignee: Air Products and Chemicals, Inc., Allentown, Pa.

[21] Appl. No.: 325,954

[22] Filed: Nov. 30, 1981

Related U.S. Application Data

[63] Continuation-in-part of Ser. No. 130,935, Mar. 17, 1980, abandoned.

[51] Int. Cl.⁴ ............................................. B01D 53/04
[52] U.S. Cl. ....................................... 55/208; 55/267; 55/387
[58] Field of Search ................. 55/161, 163, 208, 267, 55/387; 338/238, 240, 241

[56] References Cited

U.S. PATENT DOCUMENTS

| | | | |
|---|---|---|---|
| 1,451,880 | 4/1923 | Lightfoot | 338/240 X |
| 2,450,289 | 9/1948 | Marek | 55/208 X |
| 2,703,355 | 3/1955 | Hagglund | 338/238 X |
| 2,790,505 | 4/1957 | Dow | 55/267 X |
| 2,899,664 | 8/1959 | Andrews | 338/240 |
| 3,264,803 | 8/1966 | Read | 55/208 |
| 3,335,550 | 8/1967 | Stern | 55/208 |
| 3,469,375 | 9/1969 | Barrington et al. | 55/208 |
| 3,683,589 | 8/1972 | Seitz et al. | 55/208 X |
| 3,734,293 | 5/1973 | Biskis | 55/208 X |
| 3,970,821 | 7/1976 | Crandell | 338/240 X |

FOREIGN PATENT DOCUMENTS

707093  4/1954  United Kingdom ................. 55/208

OTHER PUBLICATIONS

Rohsenow, W. M. and Choi, H. Y., *Heat, Mass, and Momentum Transfer*, Prentice-Hall, Englewood Cliffs, N.J., 1961, pp. 227-230.
Kreith, F., *Principles of Heat Transfer*, International Textbook Company, Scranton, PA, 2nd Ed., 1965, pp. 453-459.
Collier, J. G., *Convective Boiling and Condensation*, McGraw-Hill, 2nd Ed., 1972.
Rohsenow, W. M. and Hartnett, J. P., *Handbook of Heat Transfer*, 1973, pp. 13—34-13—47.

Primary Examiner—Robert Spitzer
Attorney, Agent, or Firm—James C. Simmons; E. Eugene Innis

[57] ABSTRACT

A fast regenerating absorption column including a high pressure outer vessel containing an inner vessel packed with adsorption medium the inner vessel thermally isolated from the outer vessel and including means to rapidly heat and cool the adsorption medium so that a single column can be used to purify an incoming gas and can be rapidly regenerated to eliminate the need for switching adsorbers.

7 Claims, 4 Drawing Figures

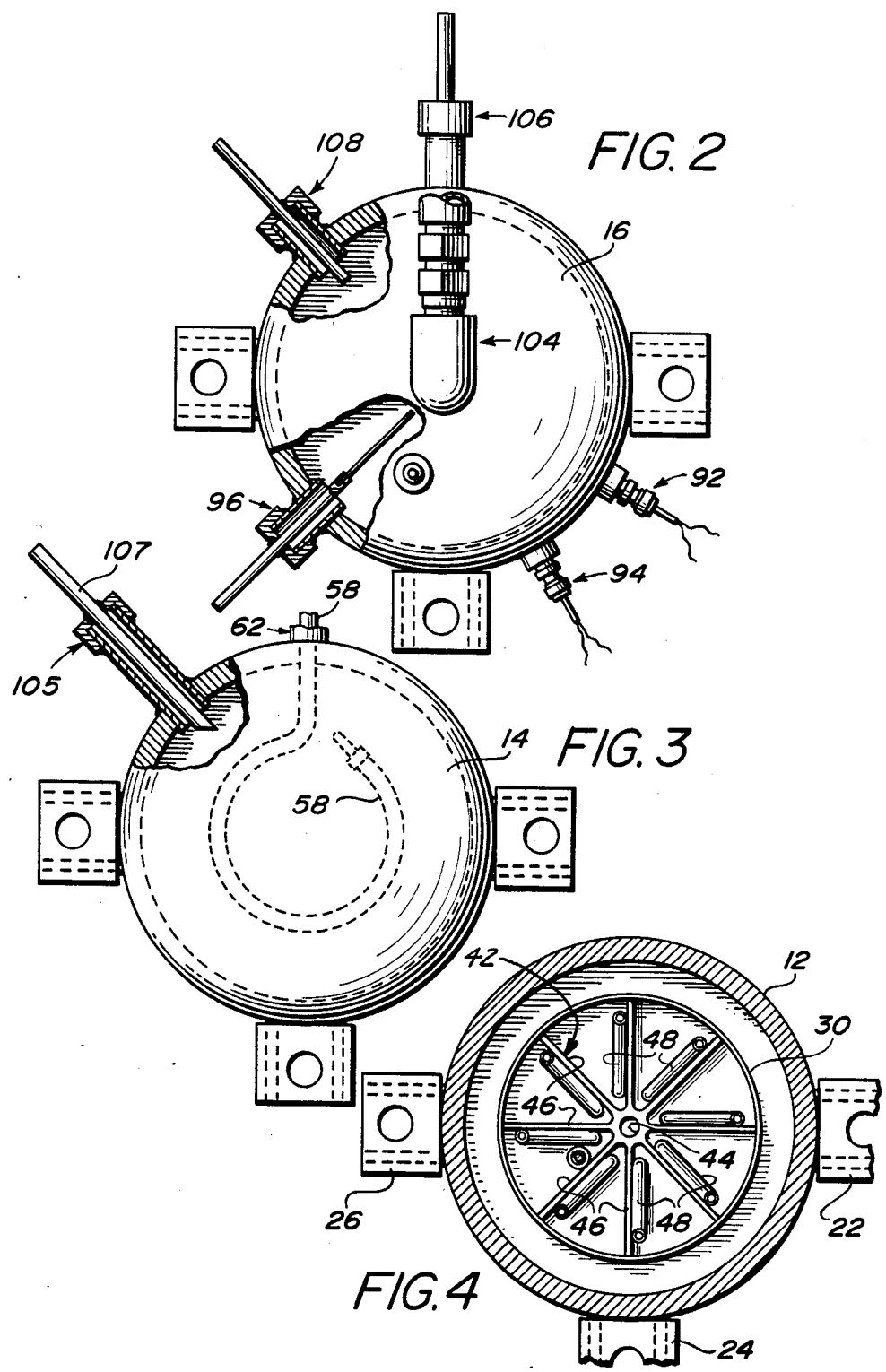

FAST REGENERATING ADSORPTION COLUMN

This application is a continuation-in-part of U.S. patent application Ser. No. 130,935 filed Mar. 17, 1980, now abandoned.

TECHNICAL FIELD

The present invention pertains to an apparatus for purifying a high pressure gas stream by adsorption of unwanted components from the gas stream and in particular to a fast regenerating adsorption column.

BACKGROUND OF THE PRIOR ART

Presently high pressure cryogenic purification systems used to continuously supply pure gas to a process require utilization of dual switching adsorbers. In the prior art units, one adsorber is processing gas (e.g. adsorbing unwanted components) while the other unit is being regenerated by removal of the components previously adsorbed from the gas stream being purified. Prior art systems with dual switching adsorbers usually are large, complex devices with complex control systems to assure the switching of the adsorbers so that the one regenerates while the other, having been regenerated, is purifying the flowing gas stream.

In U.S. Pat. No. 2,450,289 patentee discloses a device for gas separation without thermally isolating the inner vessel for fast regeneration. Patentee's design is merely to provide a flow geometry for the gas being treated.

British Pat. No. 707,093 and U.S. Pat. No. 2,790,505 disclose devices for drying gas streams wherein a layer of insulation around an inner vessel is used as a static barrier to heat conduction during steady state operation.

U.S. Pat. No. 3,264,803, discloses an adsorber utilizing a pool of boiling cryogenic fluid to cool an adsorption bed.

Other adsorbers are disclosed in U.S. Pat. Nos. 3,335,550; 3,469,375; 3,683,589 and 3,734,293.

BRIEF SUMMARY OF INVENTION

The present invention provides a fast regenerating adsorption column which includes a high pressure outer vessel containing an inner vessel packed with adsorption medium, the inner vessel being thermally isolated from the outer vessel. The apparatus includes means to rapidly heat and cool the adsorption medium so that a single column can be used to purify a gas stream. The single column can be rapidly regenerated to eliminate the need for a second adsorber thus, allowing for an uninterrupted supply of pure gas while reducing the size and complexity and operating costs normally associated with a dual switching adsorber set up.

BRIEF DESCRIPTION OF THE DRAWINGS

FIG. 2 is a top plan view of the apparatus according to the present invention.

FIG. 3 is a bottom plan view of the apparatus according to the present invention.

FIG. 4 is a section taken along the lines 4—4 of FIG. 1.

DETAILED DESCRIPTION OF THE DRAWINGS

Figure 1:
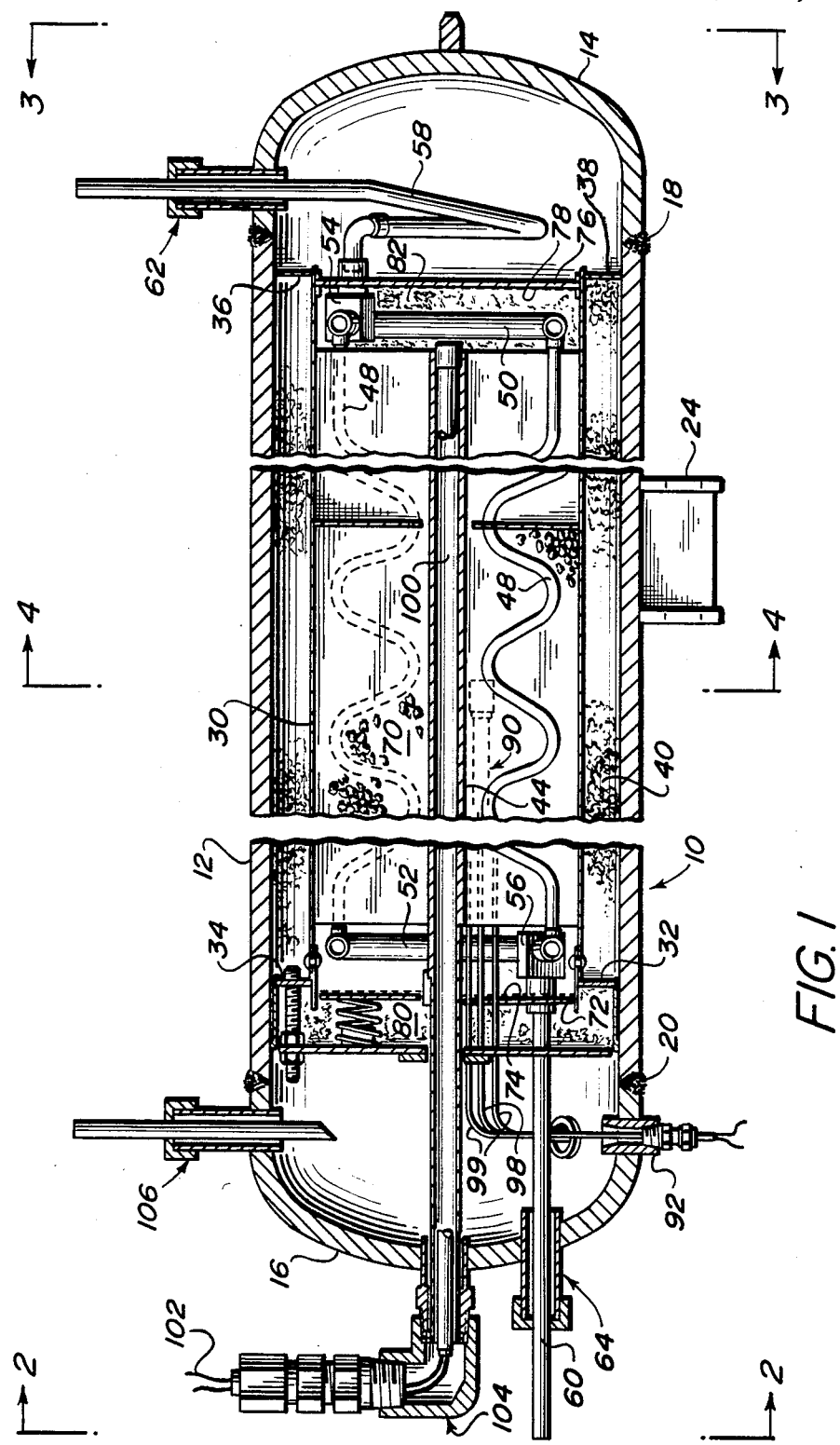
FIG. 1 is a longitudinal section through an apparatus according to the present invention.

Dual switching adsorbers for purification of high pressure gas streams have been used effectively for a long period of time. However, as pointed out above, the prior art systems require complex control systems and dual adsorbers increasing not only the capital cost but the size and complexity of the purification system. In addition, the use of dual vessels requires a large consumption of cooling fluid (e.g. nitrogen) which is normally used to cool the adsorption bed.

The present invention has for its objective, the supply of an uninterrupted high pressure purified gas, such as helium, by using an adsorber design which permits fast regeneration and sufficient capacity during purification to accomplish one of the two following objectives:
1. Build enough over capacity into the purification unit so that a reserve supply of pure gas can be stored during the purification phase of the cycle such that this gas is of sufficient quantity to feed the downstream process during the time the adsorber is being regenerated; or
2. Design the regeneration time of sufficiently short duration, in comparison to the purification run time, to keep the pure gas makeup requirements from other sources consistent with what would normally be required for such a process.

In regard to objective No. 2 above, consider the helium gas recovery and purification requirements of a laboratory size helium liquefier such as Model HL280, sold by Air Products and Chemicals, Inc. of Allentown, Pa. under the Tradename HELIFIER. With this apparatus a recovery yield of 80% of the originally liquefied gas is considered typical. Thus, one would normally expect to supply pure makeup helium from a gas supplier or other source equivalent to about 20% of the liquefier output. Thus, if t$\phi$represents the total purify cycle time, tr time required for regeneration, and, tp the time during which the purifier is actually processing impure gas, then $$t\phi = tr + tp \tag{1}$$

and on the basis of 20% makeup requirement one can tolerate a regeneration time as high as $$tr = 0.2\, t\phi \tag{2}$$

which would permit substitution of the pure helium from an alternate source during regeneration. Another way of looking at the time parameter which must be adhered to is by substituting equation 12 above into equation 1 thus yielding $$tr = \tfrac{1}{4} tp$$

thus if the adsorption bed is sufficiently large to process impure gas for 8 hours, the regeneration must be carried out in at least 2 hours.

Referring to the drawings the requirements for fast regeneration of a high pressure adsorption column can be carried out with an apparatus as shown. In particular, the column shown generally as 10 in FIG. 1 includes a first or outer pressure vessel 12 being generally elongated and cylindrical in shape closed on either end by a pair of hemispherical ends shown as bottom 14 and top 16, each of which are afixed to vessel 12 by circumferential welds 18 and 20, respectively. Ends 14,16 are adapted to receive a plurality of hermetically sealed feed throughs, the function of which will be explained more fully hereinafter.

Disposed radially at convenient locations around the circumference of vessel 12 are a plurality of supports 22,24,26 (FIG. 4) which are utilized in mounting the adsorption column 10 into an apparatus so that it can perform its purification function.

Disposed within outer vessel 12 is a second or inner vessel 30 fabricated of a highly conductive material such as aluminum. Inner vessel 30 is affixed to outer vessel 12 by a plurality of low thermal conductive supports 32,34,36 and 38. Supports 32,34,36 and 38 are preferably made of a stainless steel which is a poor thermal conductor. Supports 32,34,36 and 38 are also fabricated to provide a standoff of inner vessel 30 from outer vessel 12 and to define a fluid tight annular space between vessel 30 and vessel 12. Annular space 40 is filled with an insulating material such as packed glass wool or vermiculite. The insulating material is used in a transient heat transfer sense, i.e. to reduce temperature response of the outer wall with respect to temperature changes in the central adsorbent space inside vessel 30.

Disposed within the inner vessel 30 is a transfer apparatus shown generally as 42 (FIG. 4). Transfer means 42 includes a generally elongated cylindrical tube or mandrel 44 having disposed along its length a plurality of thermal conducting fins 46 each of which extends longitudinally for substantially the entire length of mandrel 44 and are radially disposed of around the mandrel 44. The heat transfer means 42 can be a single extrusion of aluminum or can be fabricated by welding individual fins to the center mandrel 44. The transfer apparatus must be of a highly thermal conductive material such as the aforementioned aluminum. On each of the fins 46 is disposed a conduit 48 (FIG. 4) in serpentine array (FIG. 1). Each of the conduits 48 terminates on the bottom end in a ring manifold 50 and on the top end in a ring manifold 52. Ring manifolds 50 and 52 include distributor heads 54,56, respectively which in turn communicate with an inlet conduit 58 and an outlet conduit 60, respectively, the function of which will be hereinafter more fully explained. Inlet conduit 58 projects through bottom head 14 of outer vessel 10 by means of a suitable pressure and fluid tight fitting 62 and outlet conduit 60 projects through top head 16 by a like fluid and pressure tight fitting 64.

Disposed within inner vessel 30 between fins 46 and around conduits 48 is a bed of an adsorption material such as activated charcoal 70. The activated charcoal 70 is kept within inner vessel 30 by a combination of a pair of spaced apart perforated plates and fine screening 72,74,76,78 on either end of inner vessel 30 and packed glass wool insulation 80,82. Disposed within the bed 70 is a gas purity sampling probe shown generally as 90 which includes the requisite capillary 98 projecting through head 16 of vessel 10 by an appropriate capillary feed through 96 as is well known in the art. Electrical feed throughs 92,94 (FIG. 2) and conduits 98 are adapted to permit a temperature sensor (not shown) to be disposed within the bed. The temperature sensor and the gas purity sampling probe 90 are disposed approximately 85% of the way through the bed.

Disposed within mandrel 44 is a longitudinal heating element 100 with its associated electrical conduits 102 projecting through a suitable fitting 104 in head 16 of vessel 12. Heater 100 is included to provide the necessary heat to the bed 70 during regeneration. Heating element 100 is preferably installed with a highly thermally conductive powder such as copper or aluminum as a packing material between heating element 100 and mandrel 44 so as to provide minimum thermal response time between said heater and the adsorption medium.

Vessel 10 includes an impure gas inlet fitting 105 and inlet conduit 107 (FIG. 3) and a pure gas outlet 106 (FIG. 1 and FIG. 2) as well as a sample outlet 108.

In operation fitting 105 is connected to a source of impure gas and fitting 106 is connected to the apparatus which is to receive the purified gas (e.g. helium). Fitting 62 and conduit 58 are connected to a source of liquid nitrogen and fitting 64 and conduit 60 are connected to a receptacle for receiving the liquid nitrogen. In use the liquid nitrogen is caused to flow through conduit 58 header 50, conduits 48, through header 52 conduit 60 and into a storage receptacle thus cooling fins 46 and the bed of activated charcoal 70 by forced convective boiling of liquid nitrogen. When the bed is brought to operating temperature, impure gas is admitted into the space below inner vessel 30 through fitting 105 and caused to flow upwardly through bed 70 where the impurities are removed by adsorption. The purified gas removed through conduit 106 is then used to precool the incoming impure gas stream through heat exchange and is then taken to the point of use and a portion collected for use during regeneration of the adsorber 10. When the purity monitor connected to gas sampling probe 90 determines that the adsorber should be regenerated the source of impure gas and source of liquid nitrogen are turned off and heater 100 is energized to warm the charcoal bed 70 to thus desorb the impurities from the charcoal bed. The impurities are collected or vented through fitting 107 (FIG. 3) which has been disconnected from the impure helium supply. After the bed has been regenerated the column 10 is reconnected for use in the purification mode as was described above.

An apparatus according to the present invention was tested to see if thermal isolation of the adsorption bed from the outer pressure vessel was effective. An increase in the bed temperature of 300° F. (149° C.) resulted in an outer pressure vessel 12 wall temperature increase of 24° F. (13.3° C.) or about 8% of the bed temperature swing. The 300° F. (149° C.) bed swing is about the same as will be experienced during regeneration. Since the outer pressure vessel represents the greatest thermal mass in the system an appreciable savings in liquid nitrogen can be realized since the outer vessel need not be cooled down over the same temperature range as the central adsorber core. As is well known in the art, conventional dual switching absorbers provide for heating of the entire adsorber including the outer vessel in order to achieve regeneration. With an apparatus according to the present invention, outer vessel 12 is a heavy walled cylinder made to withstand an operating pressure of 1400 psi, an operating temperature range of 80° F. (26.7° C.) to −320° F. (−196° C.). The inner vessel 30 is made to operate at a pressure of 1400 psi (96 atmospheres) and an operating temperature range of +70° F. (21.1° C.) to −320° F. (−196° C.).

STATEMENT OF INDUSTRIAL APPLICATION

An apparatus according to the present invention will be incorporated into a helium liquefier for producing liquefied helium primarily for research applications. The research applications provide for reclaiming of the helium, thus effecting a net saving on helium cost. A column according to the present invention was designed to handle 10 SCFM helium with an impurity level of up to 2% air for a period of eight hours with a regeneration time of less than two hours. The purifier will handle up to 20% air contamination by using an air condenser upstream of the adsorption column which removes all but 2% of the impurities. An apparatus according to the invention can supply pure helium gas at up to 1400 psig.

Having thus described my invention what is desired to be secured by Letters Patent of the United States is set forth in the appended claims.

What I claim is:

1. A fast regenerating adsorption column comprising in combination;
    a first or outer elongated generally cylindrical fluid tight pressure vessel;
    a second or inner vessel disposed within and thermally separated from said first vessel, said second vessel adapted to receive and hold an adsorption medium;
    transfer means within said inner vessel to rapidly introduce heat or refrigeration to said adsorption medium; said transfer means including an elongated cylinder having a plurality of elements of high thermal conductivity disposed along the axis of the cylinder in a radial pattern transverse to the cylinder axis which are in intimate thermal contact with the adsorption medium;
    a removable electrical heating element disposed within and in intimate thermal contact with said cylinder, said intimate thermal contact accomplished by means of a packing powder of high thermal conductivity, whereby said adsorption medium can be rapidly heated without excessive heat transfer to said first and second vessels;
    means for cooling said transfer means by forced convective boiling of a cryogenic fluid to maximize heat transfer rate and minimize the inverting of the cryogenic fluid; and
    means for admitting and removing a gaseous stream to be purified to said outer vessel.

2. An apparatus according to claim 1 wherein said first and second vessels are thermally separated by means of supports of low thermal conductivity thus defining an annular space between said vessels.

3. An apparatus according to claim 2 wherein said annular space is filled with insulating material.

4. An apparatus according to claim 1 wherein said inner vessel is a thermally conductive cylinder smaller in diameter and shorter in length than said outer vessel, said inner vessel having disposed therein along its cylindrical axis a hollow elongated tube or mandrel and a plurality of highly thermally conductive fins disposed radially around said mandrel extending from said mandrel to the inner wall of said inner vessel and each fin extending substantially along the axial length of said inner vessel.

5. An apparatus according to claim 4 wherein each of said fins has disposed thereon along its length a conduit for receiving a cooling fluid said conduits terminating on one end in an inlet manifold and in the other end in an outlet manifold.

6. An apparatus according to claim 4 wherein said mandrel has disposed therein an electrical heater said heater extending substantially the entire length of said fins.

7. An apparatus according to claim 4 wherein said inner vessel includes means disposed on either end to retain said adsorption medium while allowing a gas to pass through said medium.

* * * * *